(12) United States Patent
Bussmann et al.

(10) Patent No.: US 11,250,186 B2
(45) Date of Patent: Feb. 15, 2022

(54) MACHINE LEARNING APPROACH TO PIECEWISE LINEAR INTERFACE CONSTRUCTION

(71) Applicant: Autodesk, Inc., San Rafael, CA (US)

(72) Inventors: Markus Bussmann, Mississauga (CA); Mohammadmehdi Ataei, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 252 days.

(21) Appl. No.: 16/593,890

(22) Filed: Oct. 4, 2019

(65) Prior Publication Data

US 2021/0103638 A1    Apr. 8, 2021

(51) Int. Cl.
*G06F 30/20*        (2020.01)
*G06N 20/00*        (2019.01)
*G06T 17/20*        (2006.01)
*G06N 3/08*         (2006.01)
*G06F 111/10*       (2020.01)

(52) U.S. Cl.
CPC .............. *G06F 30/20* (2020.01); *G06N 3/08* (2013.01); *G06N 20/00* (2019.01); *G06T 17/20* (2013.01); *G06F 2111/10* (2020.01)

(58) Field of Classification Search
CPC ...... G06F 30/20; G06F 2111/10; G06F 30/23; G06F 30/27; G06F 2113/08; G06F 30/28; G06N 20/00; G06N 3/08; G06T 17/20
See application file for complete search history.

(56) References Cited

U.S. PATENT DOCUMENTS

2011/0238394 A1    9/2011 Shin et al.
2018/0319087 A1*  11/2018 Eom ...................... G06T 17/30

FOREIGN PATENT DOCUMENTS

CN    102129517     7/2011
CN    104750943     9/2017
KR    10-0568562    3/2006

OTHER PUBLICATIONS

M. Ataei, V. Shaayegan, F. Costa, S. Han, C. B. Park, M. Bussmann, Simulation of polymer foaming using the lattice Boltzmann method, arXiv e-prints (2019) arXiv:1908.04262v1.

(Continued)

*Primary Examiner* — Saif A Alhija
(74) *Attorney, Agent, or Firm* — Fish & Richardson P.C.

(57) ABSTRACT

Methods, systems, and apparatus, including medium-encoded computer program products, for a machine learning approach for piecewise linear interface construction include: obtaining a cell fraction for a mesh cell in a mesh, a normal vector perpendicular to a linear interface for the mesh cell, and geometry information of the mesh cell, wherein the geometry information includes at least two data values; normalizing the geometry information of the mesh cell to reduce the at least two data values to at least one data value; obtaining an output value from a machine learning algorithm, previously trained using normalized geometry information of multiple different cells of a same mesh type as the mesh cell; determining the linear interface for the mesh cell based on the output value, the normal vector and the geometry information; using the linear interface for the mesh cell in numerical simulation processing of the mesh.

20 Claims, 9 Drawing Sheets

(56) References Cited

OTHER PUBLICATIONS

C. B. Ivey, P. Moin, Accurate interface normal and curvature estimates on three-dimensional unstructured non-convex polyhedral meshes, Journal of Computational Physics, 300 (2015) 365-386.
E. Aulisa, S. Manservisi, R. Scardovelli, S. Zaleski, A geometrical area-preserving volume-of-fluid advection method, Journal of Computational Physics 192 (1) (2003) 355-364.
R. V. Garimella, V. Dyadechko, B. K. Swartz, M. J. Shashkov, Interface reconstruction in multi-fluid, multi-phase flow simulations, (2005) In: Hanks B.W. (eds) Proceedings of the 14th International Meshing Roundtable. Springer, Berlin, Heidelberg.
G. Agbaglah, S. Delaux, D. Fuster, J. Hoepffner, C. Josserand, S. Popinet, P. Ray, R. Scardovelli, S. Zaleski, Parallel simulation of multiphase flows using octree adaptivity and the volume-of-fluid method, Comptes Rendus Mécanique 339 (2) (2011) 194-207.
M. Huang, L. Wu, B. Chen, A piecewise linear interface-capturing volume-of-fluid method based on unstructured grids, Numerical Heat Transfer, Part B: Fundamentals 61 (5) (2012) 412-437.
M. Sussman, E. G. Puckett, A coupled level set and volume-of-fluid method for computing 3D and axisymmetric incompressible two-phase flows, Journal of Computational Physics 162, 301-337 (2000).
M. Renardy, Y. Renardy, J. Li, Numerical simulation of moving contact line problems using a volume-of-fluid method, Journal of Computational Physics 171 (1) (2001) 243-263.
M. Skarysz, A. Garmory, M. Dianat, An iterative interface reconstruction method for PLIC in general convex grids as part of a coupled level set volume of fluid solver, Journal of Computational Physics 368 (2018) 254-276.
R. Scardovelli, S. Zaleski, Analytical relations connecting linear interfaces and volume fractions in rectangular grids, Journal of Computational Physics 164 (1) (2000) 228-237.
X. Yang, A. J. James, Analytic relations for reconstructing piecewise linear interfaces in triangular and tetrahedral grids, Journal of Computational Physics 214 (1) (2006) 41-54.
X. Guo, W. Li, F. Iorio, Convolutional neural networks for steady flow approximation, Proceedings of the 22nd ACM SIGKDD International Conference on Knowledge Discovery and Data Mining (2016) 481-490.
Y. Qi, J. Lu, R. Scardovelli, S. Zaleski, G. Tryggvason, Computing curvature for volume of fluid methods sing machine learning, Journal of Computational Physics 377 (2019) 155-161.
J. Ling, A. Kurzawski, J. Templeton, Reynolds averaged turbulence modelling using deep neural networks with embedded invariance, Journal of Fluid Mechanics 807 (2016) 155-166.
J. López, J. Hernández, P. Gómez, F. Faura, VOFTools—A software package of calculation tools for volume of fluid methods using general convex grids, Computer Physics Communications 223 (2018) 45-54.
J. López, J. Hernández, P. Gómez, F. Faura, A new volume conservation enforcement method for PLIC reconstruction in general convex grids, Journal of Computational Physics 316 (2016) 338-359.
J. López, C. Zanzi, P. Gómez, F. Faura, J. Hernández, A new volume of fluid method in three dimensions—Part II: Piecewise-planar interface reconstruction with cubic-Bézier fit, International Journal for Numerical Methods in Fluids, (2008) 58:923-944.
J. Mencinger, I. Žun, A PLIC-VOF method suited for adaptive moving grids, Journal of Computational Physics, 230 (2011) 644-663.
D. Gueyffier, J. Li, A. Nadim, R. Scardovelli, S. Zaleski, Volume-of-fluid interface tracking with smoothed surface stress methods for three-dimensional flows, Journal of Computational Physics 152 (2)(1999) 423-456.
S. W. Welch, J. Wilson, A volume of fluid based method for fluid flows with phase change, Journal of Computational Physics 160 (2) (2000) 662-682.
K. Kleefsman, G. Fekken, A. Veldman, B. Iwanowski, B. Buchner, A volume-of-fluid based simulation method for wave impact problems, Journal of Computational Physics 206 (1) (2005) 363-393.
D. L. Youngs, Time-dependent multi-material flow with large fluid distortion, Numerical Methods in Fluid Dynamics (1982) 273-486.
W. J. Rider, D. B. Kothe, Reconstructing volume tracking, Journal of Computational Physics 141 (2) 1998) 112-152.
D. P. Kingma, J. Ba, Adam: A Method for Stochastic Optimization, arXiv e-prints (2017) arXiv:1412.6980.
S. Popinet, An accurate adaptive solver for surface-tension-driven interfacial flows, Journal of Computational Physics 228 (16) (2009) 5838-5866.
R. Scardovelli, S. Zaleski, Direct numerical simulation of free-surface and interfacial flow, Annual Review of Fluid Mechanics 31 (1) (1999) 567-603.
W. E. Lorensen, H. E. Cline, Marching cubes: A high resolution 3D surface construction algorithm, SIGGRAPH Computer Graphics 21 (4) (1987) 163-169.
E. S. C. Fan, M. Bussmann, Piecewise linear volume tracking in spherical coordinates, Applied Mathematical Modelling 37 (2013) 3077-3092.
K. Wu, C. Wang, L. Zhang, Li Hao, Moving boundary problem arising in explosion and impact: An algorithm for Youngs' interface reconstruction, International Journal of Nonlinear Sciences & Numerical Simulation, 10(8), 1051-1057, 2009.
Y. Renardy, M. Renardy, PROST: A parabolic reconstruction of surface tension for the volume-of-fluid method, Journal of Computational Physics 183, 400-421 (2002).
J. E. Pilliod Jr., E. G. Puckett, Second-order accurate volume-of-fluid algorithms for tracking material interfaces, Journal of Computational Physics 199 (2004) 465-502.
A. Alizadehdakhel, M. Rahimi, J. Sanjari, A. A. Alsairafi, CFD and artificial neural network modeling of two-phase flow pressure drop, International Communications in Heat and Mass Transfer, 36 (2009) 850-856.
T. Milcent, A. Lemoine, Moment-of-fluid analytic reconstruction on a 3D rectangular hexahedrons, Journal of Computational Physics (2019) pp. 1-33.
B. Y. Choi, M. Bussmann, A piecewise linear approach to volume tracking a triple point, International Journal for Numerical Methods in Fluids (2007) 53:1005-1018.
M. Rudman, Volume-tracking methods for interfacial flow calculations, International Journal for Numerical Methods in Fluids (1997) 24:671-691.

\* cited by examiner

MACHINE LEARNING APPROACH TO PIECEWISE LINEAR INTERFACE CONSTRUCTION

BACKGROUND

This specification relates to piecewise linear interface construction with computer numerical simulation programs for numerical simulation applications.

Volume of fluid (VOF) methods are extensively used to track fluid interfaces in numerical simulations. Many VOF algorithms require that an interface be constructed geometrically. Constructing the geometry of the interface is an important step for calculating volume fluxes advected across cell boundaries in a mesh representation of a field. For this purpose, Piecewise Linear Interface Construction (PLIC) problems needs to be solved in order to geometrically construct interfaces in VOF simulations.

Existing solutions to PLIC problems often involve complex geometrical operations that can be slow to compute. In some existing algorithms, the solution is found iteratively until a target cell fraction is achieved within a given tolerance. For simple geometric shapes, such as triangular or rectangular meshes, analytical solutions can be developed, although these analytical solutions can also include a slow iterative step used to select one equation from a set of several governing equations.

SUMMARY

This specification relates to a machine learning approach to piecewise linear interface construction in computer numerical simulation programs for numerical simulation applications.

In general, one or more aspects of the subject matter described in this specification can be embodied in one or more methods (and also one or more non-transitory computer-readable mediums tangibly encoding a computer program operable to cause data processing apparatus to perform operations) including: obtaining, in a computer numerical simulation program, a cell fraction for a mesh cell in a mesh, a normal vector perpendicular to a linear interface for the mesh cell, and geometry information of the mesh cell, wherein the geometry information includes at least two data values; normalizing, by the computer numerical simulation program, the geometry information of the mesh cell to reduce the at least two data values to at least one data value; providing, by the computer numerical simulation program, the cell fraction for the mesh cell, vector components corresponding to the normal vector perpendicular to the linear interface for the mesh cell, and the least one data value to a machine learning algorithm, wherein the machine learning algorithm was previously trained using normalized geometry information of multiple different cells of a same mesh type as the mesh cell; receiving, by the computer numerical simulation program, an output value from the machine learning algorithm; determining the linear interface for the mesh cell based on the output value, the normal vector and the geometry information; and using, by the computer numerical simulation program, the linear interface for the mesh cell in numerical simulation processing of the mesh.

The machine learning algorithm can be a neural network algorithm that employs an artificial neural network, a rectified linear unit activation function for one or more hidden layers within the artificial neural network, and a linear activation function for an output layer of the artificial neural network. The mesh type can be triangular, the mesh can be a triangular mesh, the mesh cell can be a triangle having three vertices, the geometry information can include coordinates of the three vertices in a coordinate system; and wherein the normalizing includes: identifying a longest edge of the triangle, wherein a first vertex and a second vertex are on the longest edge, and wherein a third vertex is not on the longest edge; mapping the triangle to a new coordinate system having an origin, including mapping the longest edge along one axis of the new coordinate system, wherein the first vertex is at the origin and a length of the longest edge equals to 1 after mapping; obtaining a normalized geometry information for the triangle that only has a coordinate of the third vertex in the new coordinate system, and a normalized normal vector in the new coordinate system; and wherein the providing includes: providing the cell fraction for the triangular mesh cell, vector components corresponding to the normalized normal vector, and the normalized geometry information for the triangle to the neural network algorithm, wherein the neural network algorithm was previously trained using normalized geometry information of multiple different triangles of multiple triangular mesh cells; and wherein the determining includes: obtaining a final output value by remapping the output value back to the coordinate system of the triangular mesh cell; determining a reconstructed line by the normal vector and the final output value; and determining the linear interface for the triangular mesh cell by intersecting the reconstructed line with the triangle.

The method (or operations performed by the data processing apparatus in accordance with the computer program tangibly encoded in one or more non-transitory computer-readable mediums) can include training the neural network algorithm. Training the neural network algorithm can include: generating, by synthetic simulation, multiple different cells of a same mesh type as training inputs, wherein each of the training inputs includes a cell fraction, an interface normal vector and a normalized geometry information of a mesh cell; obtaining, for each of the training inputs, a respective target output for the training input; training the neural network algorithm on the training inputs and the corresponding target outputs.

The mesh can be a first mesh type, the computer numerical simulation program can use linear interfaces for mesh cells in numerical simulation processing of two or more different types of meshes, including the first mesh type, and the neural network algorithm employs a separately trained artificial neural network for each of the two or more different types of meshes. The two or more different types of meshes can include two or more of a square mesh type, a cubic mesh type, a rectangular mesh type, a rectangular cuboid mesh type, a triangular mesh type, a tetrahedron mesh type, a quadrilateral mesh type, and an irregular hexahedron mesh type.

The numerical simulation processing can include Computational Fluid Dynamics simulation, and the method (or operations performed by the data processing apparatus in accordance with the computer program tangibly encoded in one or more non-transitory computer-readable mediums) can include tracking fluid interfaces using the linear interface for the mesh cell in a mesh. The numerical simulation processing can include plastic injection molding simulation, and the method (or operations performed by the data processing apparatus in accordance with the computer program tangibly encoded in one or more non-transitory computer-readable mediums) can include simulating behavior of the plastic material in injection molding process using the linear interface for the mesh cell in a mesh. The numerical simulation processing can include a topology or geometry optimization based on a solution field variable and a threshold value.

One or more aspects of the subject matter described in this specification can also be embodied in one or more systems including: a non-transitory storage medium having instructions of a computer numerical simulation program stored thereon; and one or more data processing apparatus configured to run the instructions of the computer numerical simulation program to perform operations specified by the instructions of the computer numerical simulation program; wherein the operations include: obtaining a cell fraction for a mesh cell in a mesh, a normal vector perpendicular to a linear interface for the mesh cell, and geometry information of the mesh cell, wherein the geometry information includes at least two data values; normalizing the geometry information of the mesh cell to reduce the at least two data values to at least one data value; providing the cell fraction for the mesh cell, vector components corresponding to the normal vector perpendicular to the linear interface for the mesh cell, and the least one data value to a machine learning algorithm, wherein the machine learning algorithm was previously trained using normalized geometry information of multiple different cells of a same mesh type as the mesh cell; receiving an output value from the machine learning algorithm; determining the linear interface for the mesh cell based on the output value, the normal vector and the geometry information; and using the linear interface for the mesh cell in numerical simulation processing of the mesh.

The machine learning algorithm can be a neural network algorithm that employs an artificial neural network, a rectified linear unit activation function for one or more hidden layers within the artificial neural network, and a linear activation function for an output layer of the artificial neural network. The mesh type can be triangular, the mesh can be a triangular mesh, the mesh cell can be a triangle having three vertices, the geometry information can include coordinates of the three vertices in a coordinate system; wherein the normalizing includes: identifying a longest edge of the triangle, wherein a first vertex and a second vertex are on the longest edge, and wherein a third vertex is not on the longest edge; mapping the triangle to a new coordinate system having an origin, including mapping the longest edge along one axis of the new coordinate system, wherein the first vertex is at the origin and a length of the longest edge equals to 1 after mapping; obtaining a normalized geometry information for the triangle that only has a coordinate of the third vertex in the new coordinate system, and a normalized normal vector in the new coordinate system; and wherein the providing includes: providing the cell fraction for the triangular mesh cell, vector components corresponding to the normalized normal vector, and the normalized geometry information for the triangle to the neural network algorithm, wherein the neural network algorithm was previously trained using normalized geometry information of multiple different triangles of multiple triangular mesh cells; and wherein the determining includes: obtaining a final output value by remapping the output value back to the coordinate system of the triangular mesh cell; determining a reconstructed line by the normal vector and the final output value; and determining the linear interface for the triangular mesh cell by intersecting the reconstructed line with the triangle.

The operations can further include training the neural network algorithm. Training the neural network algorithm can include: generating, by synthetic simulation, multiple different cells of a same mesh type as training inputs, wherein each of the training inputs includes a cell fraction, an interface normal vector and a normalized geometry information of a mesh cell; obtaining, for each of the training inputs, a respective target output for the training input; training the neural network algorithm on the training inputs and the corresponding target outputs.

Particular embodiments of the subject matter described in this specification can be implemented to realize one or more of the following advantages. Piecewise linear interface construction problems can be solved by a data-driven machine learning approach. The machine learning approach uses a machine learning model, which can be trained on a large synthetic dataset of PLIC solutions for various two-dimensional and three-dimensional mesh types, such as square, triangular, quadrilateral, cubic, rectangular cuboid, tetrahedron and irregular hexahedron meshes, etc. The machine learning approach can result in accurate calculations at a fraction of the usual computation cost of existing numerical methods which can be prohibitive. In Computational Fluid Dynamics (CFD), the machine learning based PLIC can design optimal fluid flow, can model free surface movement, and can resolve interactions between different phases. In plastic injection molding, the machine learning based PLIC can simulate movement of the plastic material in an injection molding process and can identify potential problems before beginning production. In geometry optimization and automatic design applications, the machine learning based PLIC can be used to construct a product or component design geometry from a solution field variable.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
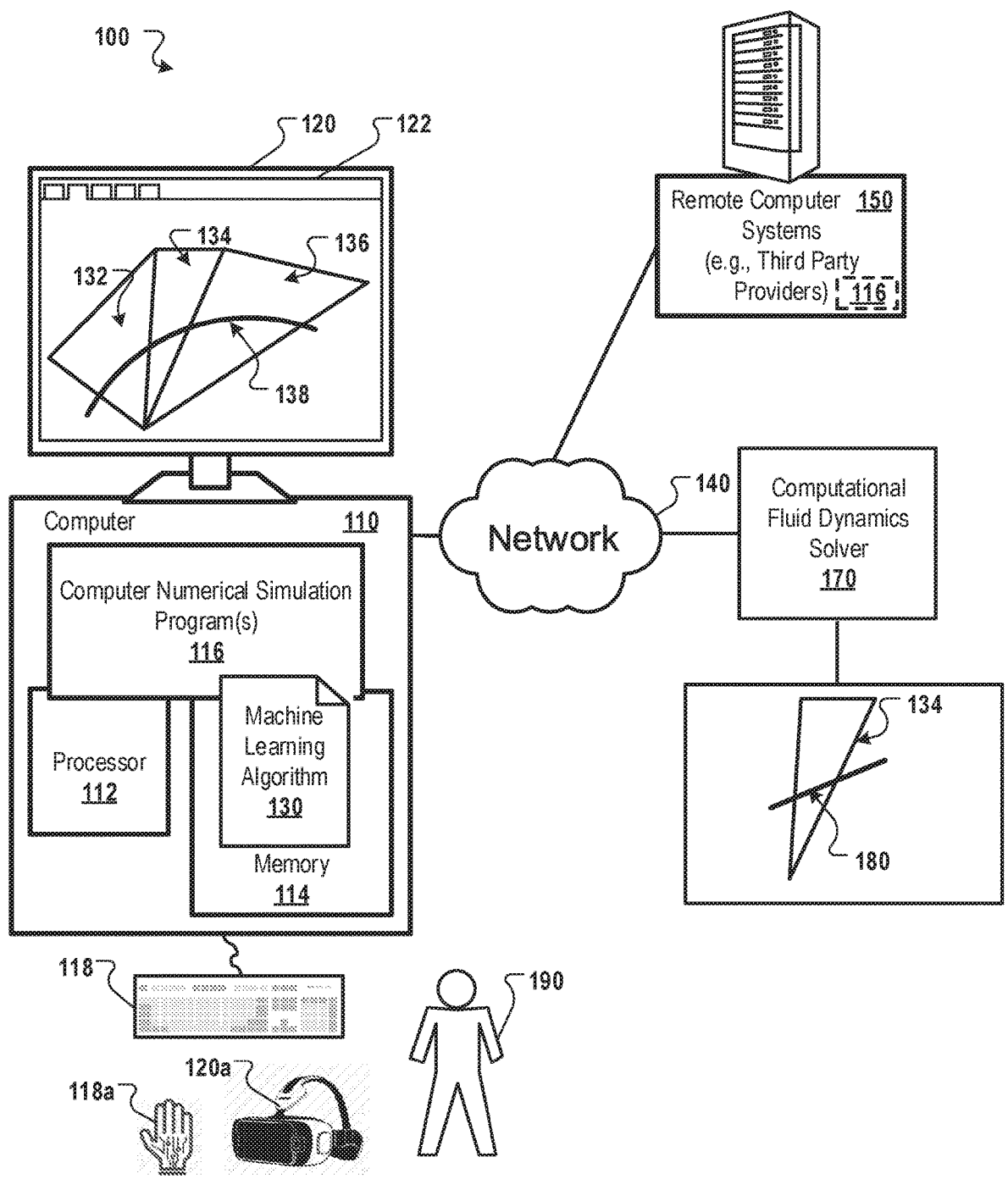
FIG. 1 shows an example of a system usable in a Computational Fluid Dynamics (CFD) solver to compute mesh cell interfaces through numerical simulations.

FIG. 1 shows an example of a system 100 usable in a Computational Fluid Dynamics (CFD) solver 170 to compute mesh cell interfaces for numerical simulations. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Numerical Simulation (CNS) program(s) 116, which employ a machine learning approach to Piecewise Linear Interface Construction (PLIC). A machine learning algorithm 130 is stored in the memory 114 and can be accessed by the CNS program(s) 116.

The CNS program(s) 116 can perform many different kinds of computer numerical simulation applications. FIG. 1 shows a Computational Fluid Dynamics (CFD) Solver 170 that uses the CNS program(s) 116. The CFD solver 170 can submit a numerical simulation problem to the computer 110 through network 140 and can get a solution for the problem from the computer 110 that calculates the solution through CNS program(s) 116 stored in the computer 110. Alternatively, the CFD solver 170 can download a copy of the CNS program(s) 116 and the corresponding machine learning algorithm 130 through the network 140, and can compute the solution within the CFD solver by using the downloaded copy of the CNS program(s) and the downloaded machine learning algorithm.

A CFD solver uses numerical analysis and data structures to analyze and solve problems that involve fluid flows. A CFD solver can be based on Volume of Fluid (VOF) algorithms to construct and track fluid interfaces in numerical simulations. Many VOF algorithms require that the interface be constructed geometrically and frequently uses PLIC techniques that are solved iteratively or analytically. Due to geometric complexity, these iterative and analytical PLIC techniques can be slow and difficult to implement.

The CFD solver 170 can access the CNS program(s) 116 which uses the systems and techniques described herein to implement a machine learning approach to PLIC. The machine learning approach uses a machine learning model 130, which can be trained on a large synthetic dataset PLIC solutions for various mesh types, such as square, triangular, quadrilateral, cubic, rectangular cuboid, tetrahedron, irregular hexahedron meshes, etc. This machine learning approach can result in accurate calculations at a fraction of the usual computation cost.

The CNS program(s) 116 can obtain a mesh representation of an object. The mesh of an object can include many mesh cells. The mesh cells can be 2D mesh cells or 3D mesh cells. For example, three triangular mesh cells 132, 134 and 136 can represent a mesh surface of an object. As another example, for volumetric objects, such as fluids and gases, the volume occupied can be divided into many 3D mesh cells. These 2D or 3D mesh cells may be uniform or non-uniform, structured or unstructured, including a combination of one or more of cell types. Typical 2D cell types include square, rectangle, triangle, quadrilateral, etc. Typical 3D cell types include cubic, rectangular cuboid, tetrahedron, hexahedron, etc.

An interface can divide an object into two parts. In computer numerical simulation, mesh cells that are in contact with the interface are divided into smaller parts. For example, in FIG. 1, each of the three triangular mesh cells 132, 134 and 136 is divided into two parts by an interface 138. The CNS program(s) 116 can obtain one or more properties of the interface 138 (e.g., a normal vector perpendicular to a to-be-determined linear interface) and one or more properties of the divided parts (e.g., a cell fraction of the parts of a cell).

The CNS program(s) 116 can take these properties of the interface and divided parts as inputs, and can use the systems and techniques described herein to compute a piecewise linear approximation of the interface 138, including computing a linear interface for each of the mesh cells. For example, the CNS program(s) 116 can compute a linear interface 180 for the triangular mesh cell 134. The linear interface 180 is a linear approximation for a part of the interface 138 that intersects with cell 134. Similarly, the CNS program(s) 116 can also compute a linear interface for each one of the triangular mesh cells 132 and 136.

The CNS program(s) 116 can run locally on computer 110, remotely on a computer of one or more remote computer systems 150 (e.g., one or more third party providers' one or more server systems accessible by the computer 110 via the network 140) or both locally and remotely. Thus, a CNS program 116 can be two or more programs that operate cooperatively on two or more separate computer processors in that a program 116 operating locally at computer 110 can offload processing operations (e.g., computation through machine learning model) "to the cloud" by having one or more programs 116 on one or more computers 150 perform the offloaded processing operations.

The CNS program(s) 116 present a user interface (UI) 122 on a display device 120 of the computer 110, which can be operated using one or more input devices 118 of the computer 110 (e.g., keyboard and mouse) by a user 190. Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

Figure 2A:
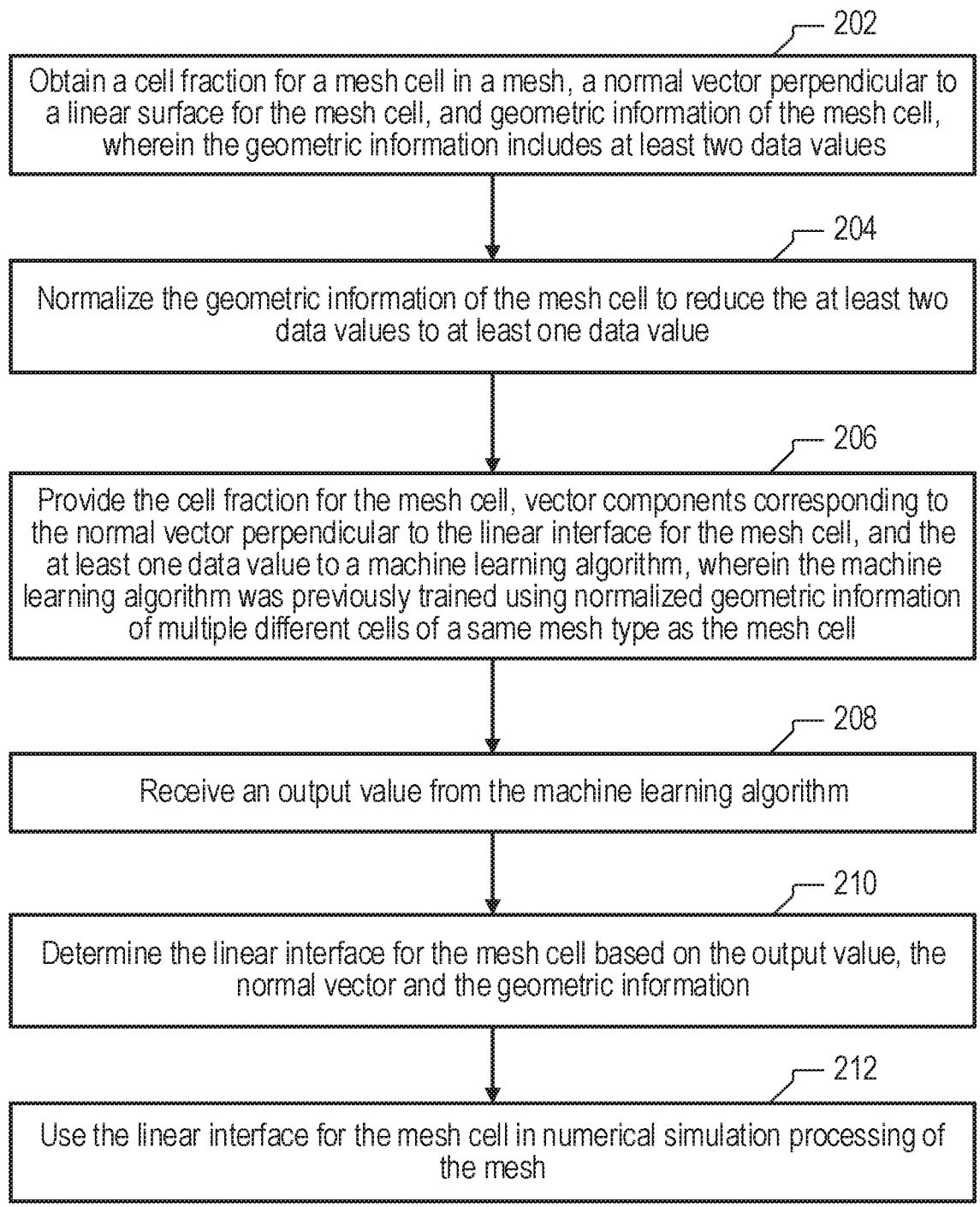
FIG. 2A is a flowchart showing an example of a process to compute a linear interface for a mesh cell using a trained machine learning algorithm.

FIG. 2A is a flowchart showing an example of a process to compute a linear interface for a mesh cell using a trained machine learning algorithm. A cell fraction for a mesh cell in a mesh, a normal vector perpendicular to a linear interface for the mesh cell, and geometry information of the mesh cell are obtained 202, e.g., by the CNS program(s) 116. The cell fraction for a mesh cell in a mesh is a scalar value that represents the fractional part of one portion of the mesh cell within the mesh cell. In 3D, the cell fraction is a volume fraction for a 3D cell in a 3D mesh. For example, in the case of a liquid-gas system, the volume fraction can represent the fraction of liquid in a cell. Here, volume fraction equals 1 in liquid cells, and volume fraction equals 0 in gas cells, and volume fraction is between 0 and 1 in interface cells. The cell fraction can be predetermined and is an input to the CNS program(s) 116.

The normal vector is a known vector that can represent the orientation of the interface. For example, as shown in FIG. 1, a different normal vector can be obtained for each of the mesh cells 132, 134 and 136 because the interface 138 cut through each cell at different orientations. A normal vector can be obtained to describe the orientation of the interface in the mesh cell. The normal vector can be represented as ($n_x$, $n_y$) for 2D cells and ($n_x$, $n_y$, $n_z$) for 3D cells. Here, $n_x$, $n_y$, $n_z$ are the normal vector components in a coordinate system that represent a direction that is perpendicular to a to-be-determined linear interface.

A mesh can be made up of regular mesh cells, e.g., square and cubic mesh cells. The shape of a regular cell is regular and the geometries of the cell is constant. So a linear interface can be defined only by the normal vector and the cell fraction, without the need for additional geometric information.

Alternatively, a mesh can be made up of irregular mesh cells, such as triangles, quadrilateral, tetrahedron and irregular hexahedron, etc. For example, triangular cells 132, 134 and 136 are arbitrarily-shaped triangles. Besides normal vector and cell fraction, the CNS program(s) 116 should obtain additional information about the geometry of the mesh cell in order to compute the linear interface for the mesh cell.

The geometric information of the mesh cell describes the shape and position of a mesh cell in a mesh. The geometric information can include at least two data values. For example, for the triangular mesh cell 134, the geometric information includes coordinates of the three vertices in a coordinate system. For a 3D rectangular cuboid mesh cell, the geometric information can include the height, length, and width of the cell.

The geometric information of the mesh cell is normalized 204 to reduce the at least two data values to at least one data value, e.g., by the CNS program(s) 116. In a machine learning algorithm, the input data to the algorithm can be normalized to values that are within a certain range, such as [0, 1], or [-1, 1]. The normalization of the input data generally speeds up learning and leads to faster convergence during the training of the machine learning algorithm. In terms of mesh geometries, normalization of the geometric information also significantly reduces the number of possible cases of a certain mesh type by eliminating geometrically similar shapes. Moreover, normalization of the geometric information reduces the number of geometric data values required to describe a mesh geometry.

For some mesh cell types, normalizing the geometric information includes mapping the cell to a new coordinate system. Therefore, a correctly-oriented and normalized normal vector in the new coordinate system also needs to be calculated. More details about normalizing the geometric information for various cell types are described below in connection with FIG. 3A and FIG. 3B.

The cell fraction for the mesh cell, vector components corresponding to the normal vector perpendicular to the linear interface for the mesh cell, and the at least one data value in the normalized geometric information are provided 206 to a machine learning algorithm, e.g., by the CNS program(s) 116. The machine learning algorithm was previously trained to predict a linear interface for a mesh cell. For example, a machine learning algorithm previously trained using normalized geometric information of rectangular mesh cells can be used to process input data for a rectangular mesh cell and predict the linear interface for the rectangular mesh cell. The normalized geometric information of a rectangular mesh can be its length-to-width ratio r=b/a. Therefore, the input data to the machine learning algorithm can be (r, $a_0$, $n_x$, $n_y$), wherein $a_0$ is the cell fraction and ($n_x$, $n_y$) are the vector components corresponding to the normal vector perpendicular to a to-be-determined linear interface for the rectangular mesh cell.

The machine learning algorithm was previously trained using training inputs that include normalized geometric information of multiple different cells of a same mesh type as the mesh cell. In some implementations, the machine learning algorithm can be a neural network algorithm that employs an artificial neural network with one or more hidden layers. More details about neural network architectures are described below in connection with FIG. 4A and FIG. 4B.

For each mesh cell type, a machine learning algorithm was trained to generate corresponding target outputs for given training inputs of the same cell type. The training inputs can be generated by synthetic simulation. Each training input can include a cell fraction, an interface normal vector and a normalized geometric information of a mesh cell. For each training input, a respective target output for the training input can be generated by synthetic simulation. More details about training the machine learning algorithm are described below in connection with FIG. 5.

An output from the machine learning algorithm is received 208, e.g., by the CNS program(s) 116. Given a known normal vector n and a known cell fraction $a_0$ of a mesh cell, the output of the machine learning algorithm is the value C, which defines a linear interface:

$$\vec{n} \cdot \vec{x} + C = 0,$$

that splits the cell into two parts, with cell fraction $a_0$ and 1−$a_0$. Here, $\vec{x} \in R^2$ for 2D mesh cells and $\vec{x} \in R^3$ for 3D mesh cells. The linear interface can be a line for 2D mesh cells or a plane for 3D mesh cells. For example, for a cubic mesh cell, the linear interface defined by $\vec{n} \cdot \vec{x} + C = 0$ is a 2D plane and the constructed surface is a linear polygon that results from the intersection of the plane with the cubic cell.

The linear interface for the mesh cell is determined 210 based on the output value, the normal vector and the geometric information, e.g., by the CNS program(s) 116. As discussed above, the interface is defined by the normal vector and the output value of the machine learning algorithm. An intersection between the mesh cell and the interface can be determined based on the geometry information of the mesh cell. In some implementations, the output value may need to be remapped back to the coordinate system of the mesh before calculating the linear interface for the mesh cell.

The linear interface for the mesh cell is used 212 in numerical simulation processing of the mesh, e.g., by the CNS program(s) 116. In a CFD solver, the constructed piecewise linear interface of interface cells can be used to calculate interface volume fluxes geometrically during a multiphase simulation, e.g., simulation of a droplet impacting a pool of liquid. The CFD solver can use machine learning based PLIC to solve the advection equation for the volume fraction field.

In plastic injection and compression molding design, numerical simulation tools can simulate the behavior of the plastic materials in injection molding process and can identify potential challenges in manufacturing plastic injection molded parts before beginning production. For example, using the machine learning based PLIC simulation, plastic injection molding design tools can find area that are difficult to fill. As another example, in gas-assisted injection molding, the shape and penetration of a gas channel can be simulated by machine learning based PLIC. Numerical simulation tools can track the gas and liquid interface using machine learning based PLIC and therefore improve the location of injection position and delay time.

In computer graphics, the systems and techniques discussed herein can be used to extract a polyhedral mesh surface from a 3D iso-surface for further mesh-based calculation or for efficient visualization. The CNS program first translates the iso-surface into a VOF scalar over a cubic mesh grid, and then the CNS program can construct the surface mesh representing the interface in each individual cube by using the machine learning based PLIC.

Figure 2B:
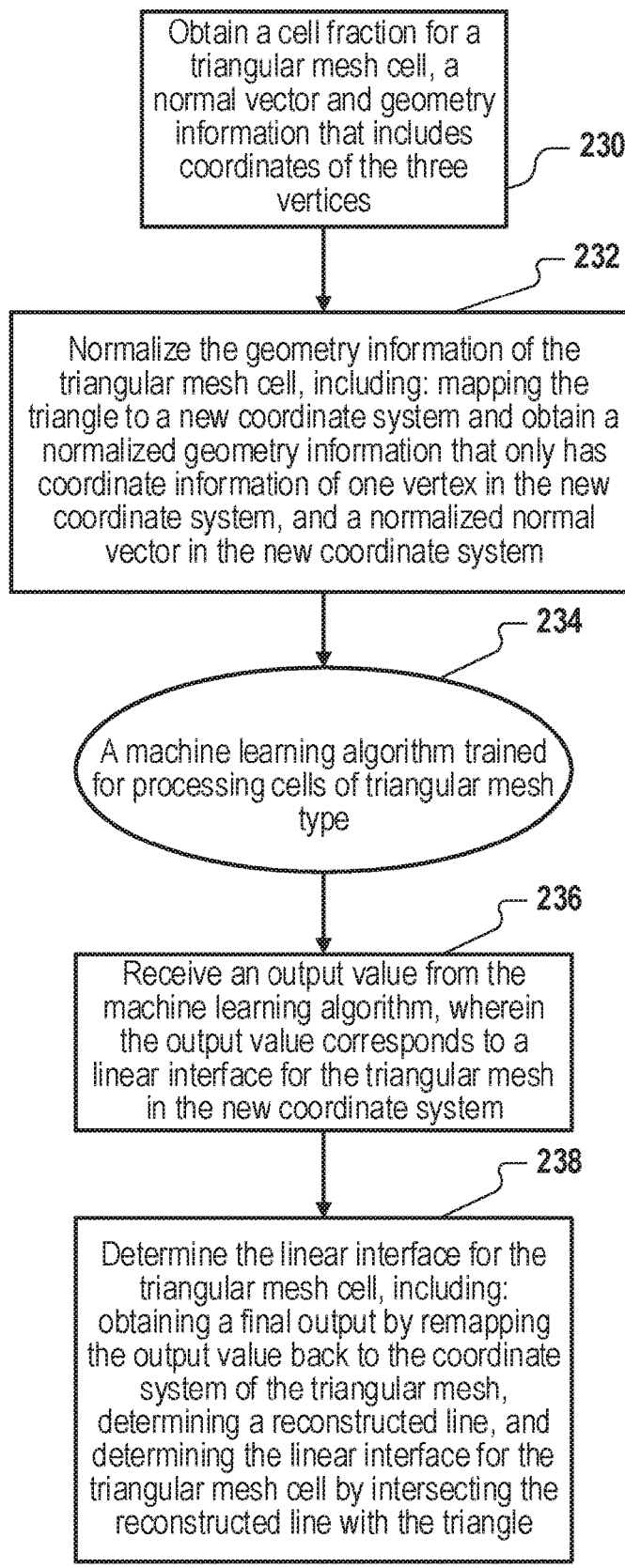
FIG. 2B shows an example of the process of FIG. 2A applied to a triangular mesh cell.
Figure 2B:
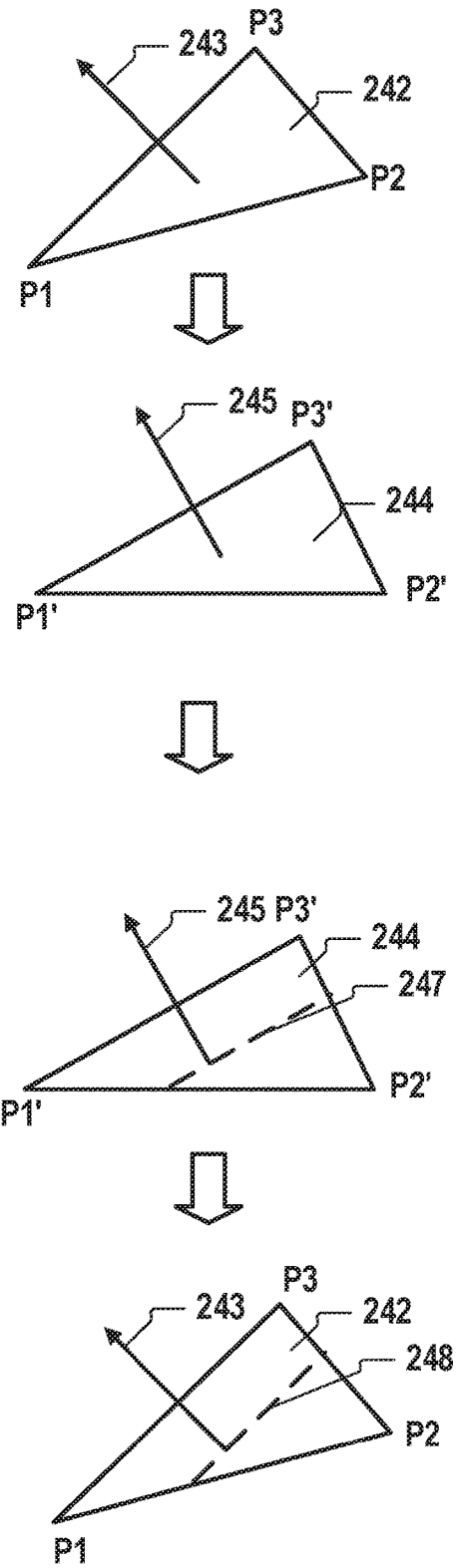

FIG. 2B shows an example of the process of FIG. 2A applied to a triangular mesh cell. Triangular meshes includes arbitrarily-shaped irregular triangular mesh cells. Therefore, the input to the machine learning algorithm needs to include information about the geometry of the triangular mesh cells. In this example, the mesh is a triangular mesh, the mesh type is triangular, and the mesh cell is a triangle 242 having three vertices $P_1$, $P_2$ and $P_3$.

A cell fraction $a_0$, a normal vector 243 and geometry information are obtained 230, e.g., by the CNS program(s). The geometry information for the triangle 242 includes coordinates of the three vertices $P_1$, $P_2$ and P in a coordinate system. The geometry information has six data values ($P_{1x}$, $P_{1y}$, $P_{2x}$, $P_{2y}$, $P_{3x}$, $P_{3y}$). The normal vector 243 is perpendicular to a to-be-determined line interface for the triangular mesh cell and can be represent by its vector components $\vec{n}=(n_x, n_y)$.

The geometry information of the triangular mesh cell is normalized 232, e.g., by the CNS program(s). The triangle 242 is mapped to a new coordinate system by the CNS program(s) and the triangle 242 is normalized to a normalized triangle 244 with three vertices $P_1'$, $P_2'$ and $P_3'$ in the new coordinate system.

Figure 3A:
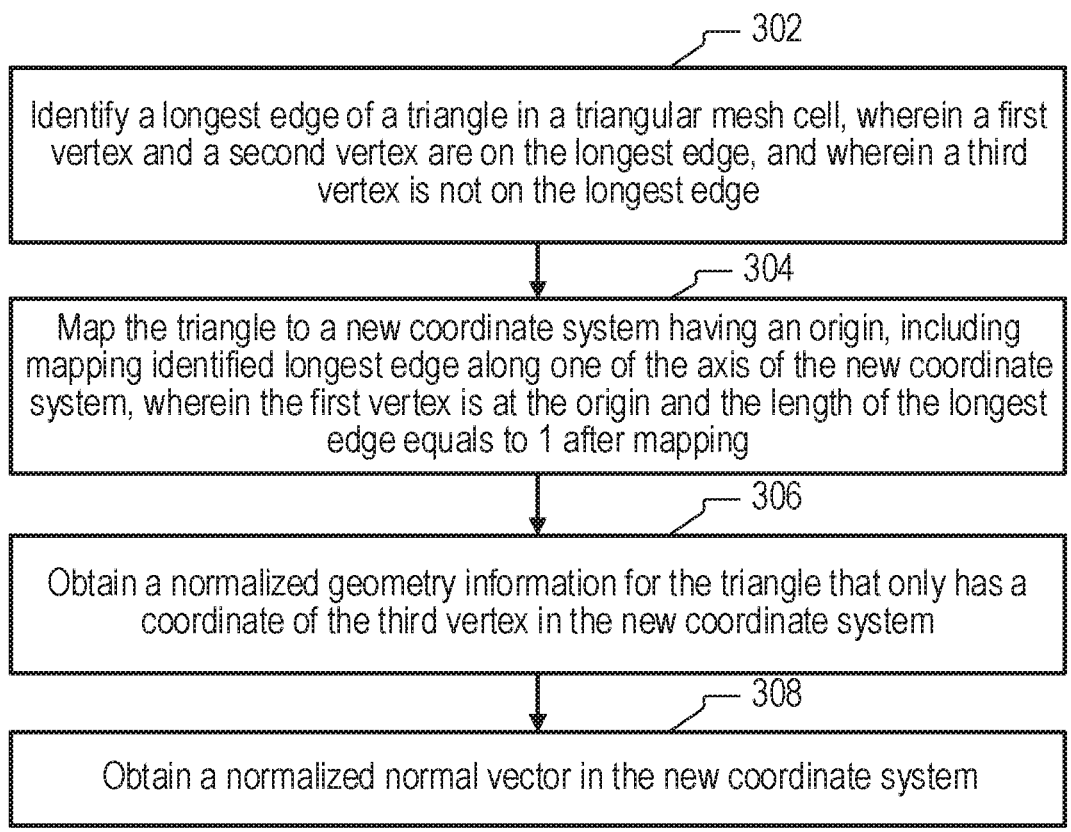
FIG. 3A is a flowchart showing an example of a process to normalize the geometry information of a triangular mesh cell.
Figure 3B:
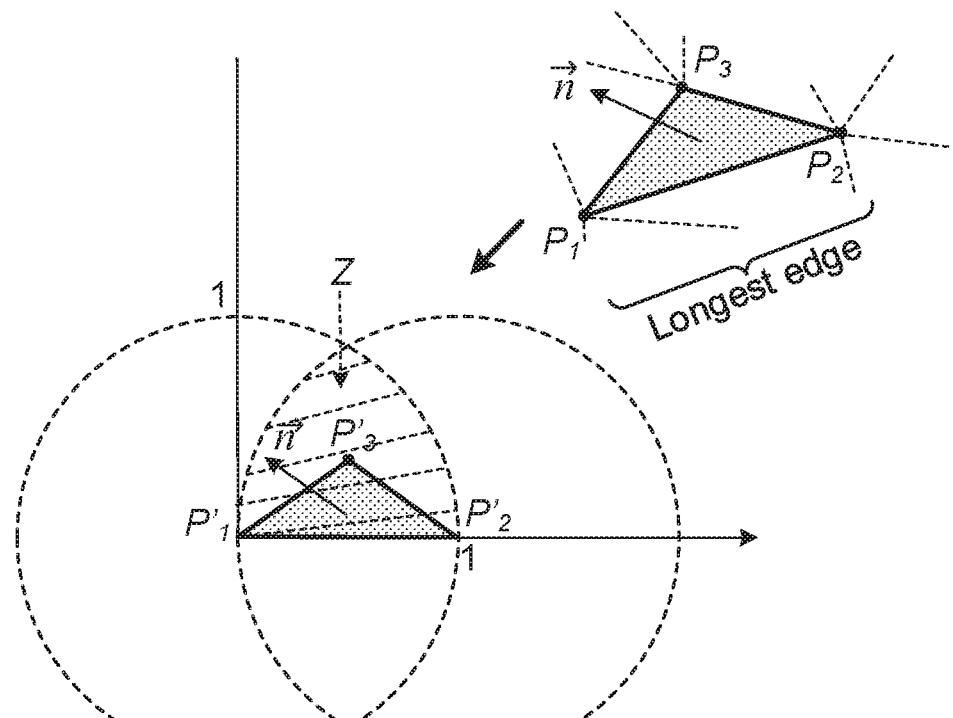
FIG. 3B is a schematic diagram showing the process of FIG. 3A to normalize the geometry information of a triangular mesh cell.

FIG. 3A is a flowchart showing more details of the process 232 that normalizes the geometry information of the triangular mesh cell 242. FIG. 3B is a schematic diagram showing the process of FIG. 3A.

A longest edge of the triangle is identified 302, e.g., by the CNS program(s). As shown in FIG. 3B, the vertices $P_1$ and $P_2$ are on the longest edge $P_1$-$P_2$, and the vertex $P_3$ is not on the longest edge.

The triangle is mapped 304 to a new coordinate system, e.g., by the CNS program(s). As shown in FIG. 3B, the triangle is normalized to a normalized triangle with three vertices $P_1'$, $P_2'$ and $P_3'$ in the new coordinate system. The CNS program(s) map the identified longest edge along one of the axes of the new coordinate system oriented in the direction that the coordinates of $P_3'$ are positive. After mapping, the vertex $P_1'$ corresponding to $P_1$ is at the origin of the new coordinate system and the length of the longest edge $P_1'$-$P_2'$ equals to 1. Because the edge $P_1'$-$P_2'$ is the longest, for any irregular triangle, the vertex $P_3'$ is limited to the area Z shown in FIG. 3B. Therefore, the value for the coordinates of $P_3'$ is within a range of [0, 1].

A normalized geometry information in the new coordinate system is obtained 306, e.g., by the CNS program(s) for the normalized triangle. As shown in FIG. 3B, the normalized geometry information only has coordinate information of the vertex $P_3'$ in the new coordinate system, which only has two data values ($P_{3x}'$, $P_{3y}'$), both of which are within a range of [0, 1]. Therefore, the geometry information of the triangular mesh cell is reduced from six data values ($P_{1x}$, $P_{1y}$, $P_{2x}$, $P_{2y}$, $P_{3x}$, $P_{3y}$) to two data values ($P_{3x}'$, $P_{3y}'$).

A normalized normal vector $\vec{n}'$ in the new coordinate system is obtained 308, e.g., by the CNS program(s) by mapping the normal vector $\vec{n}$ to the new coordinate system. As shown in FIG. 3B, the normalized normal vector $\vec{n}'$ is perpendicular to a to-be-determined line interface for the normalized triangle and can be represented by its vector components $\vec{n}'=(n_x', n_y')$. The cell fraction $a_0$ remains unchanged for normalized triangle in the new coordinate system.

Returning to FIG. 2B, the cell fraction $a_0$, the vector components $\vec{n}'=(n_x', n_y')$ corresponding to the normalized normal vector 245, and the normalized geometry information ($P_{3x}'$, $P_{3y}'$) are provided 234 to a machine learning algorithm, e.g., by the CNS program(s). The machine learning algorithm was previously trained for processing cells of triangular mesh type.

In some implementations, the machine learning algorithm is a neural network algorithm. The input layer of the neural network can take an input vector, such as ($P_{3x}'$, $P_{3y}'$, $n_x'$, $n_y'$, $a_0$). The neural network can output a scalar value through a regression neural network. The scalar value output can define a line interface that intersects with the triangular mesh.

An output value C' from the machine learning algorithm is received 236, e.g., by the CNS program(s). The output value C' corresponds to a linear interface for the normalized triangle 244 of the triangular mesh cell in the new coordinate system. Given the known normalized normal vector $n'=(n_x', n_y')$ and the known cell fraction $a_0$ of the normalized triangle 244, the output value C' defines a constructed line 247 represented by an equation $$\vec{n}' \cdot \vec{x}' + C' = 0$$

that splits the cell into two parts, with cell fraction $a_0$ and $1-a_0$.

The linear interface for the triangle 242 of the triangular mesh cell in the original coordinate system is determined 238, e.g., by the CNS program(s). First, the CNS program(s) obtain a final output value C by remapping the output value C' to the coordinate system of the triangle 242. Next, given the known normalized normal vector 243 $\vec{n}=(n_x, n_y)$ and the known cell fraction $a_0$ of the triangle 242, the output value C defines a constructed line 248 represented by an equation $$\vec{n} \cdot \vec{x} + C = 0$$

that splits the cell into two parts, with cell fraction $a_0$ and $1-a_0$. Finally, the linear interface for the triangular mesh cell is determined by intersecting the constructed line 248 with the triangle 242.

Normalizing the geometry information of mesh cells of other types can following a similar process as described in FIG. 3A and FIG. 3B. In 2D, quadrilateral and rectangular meshes are commonly used in computer numerical simulations. In 3D, tetrahedron, rectangular cuboid, and irregular hexahedron meshes are frequently used in computer numerical simulation. The CNS program(s) can normalize the geometry information for these 2D and 3D mesh cells by mapping the cells into a new coordinate system, and can reduce the number of values needed to represent the geometry information of these mesh cells.

Figure 3C:
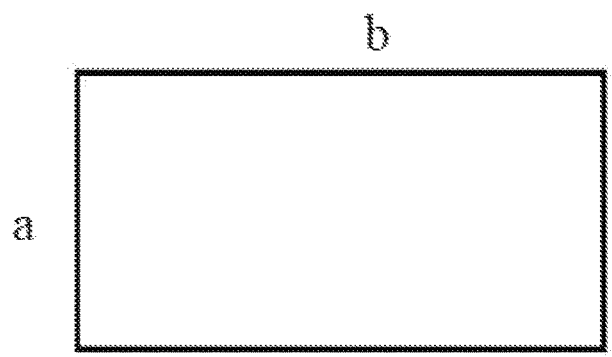
FIG. 3C is a schematic diagram showing the process to normalize the geometry information of a rectangular mesh cell.

FIG. 3C is a schematic diagram showing the process to normalize the geometry information of a rectangular mesh cell. The normalized geometry information of a rectangular mesh cell can be its width-to-length ratio $r=a/b$. It is preferred that the normalized geometry information $r=a/b$ is less than 1 and the length b is longer than the width a. Therefore, the input layer to the neural network can be a vector $(r, a_0, n_x', n_y')$, where $n_x', n_y'$ are the normalized normal vector components in a new coordinate system whose axes are parallel to the rectangle sides.

Figure 3D:
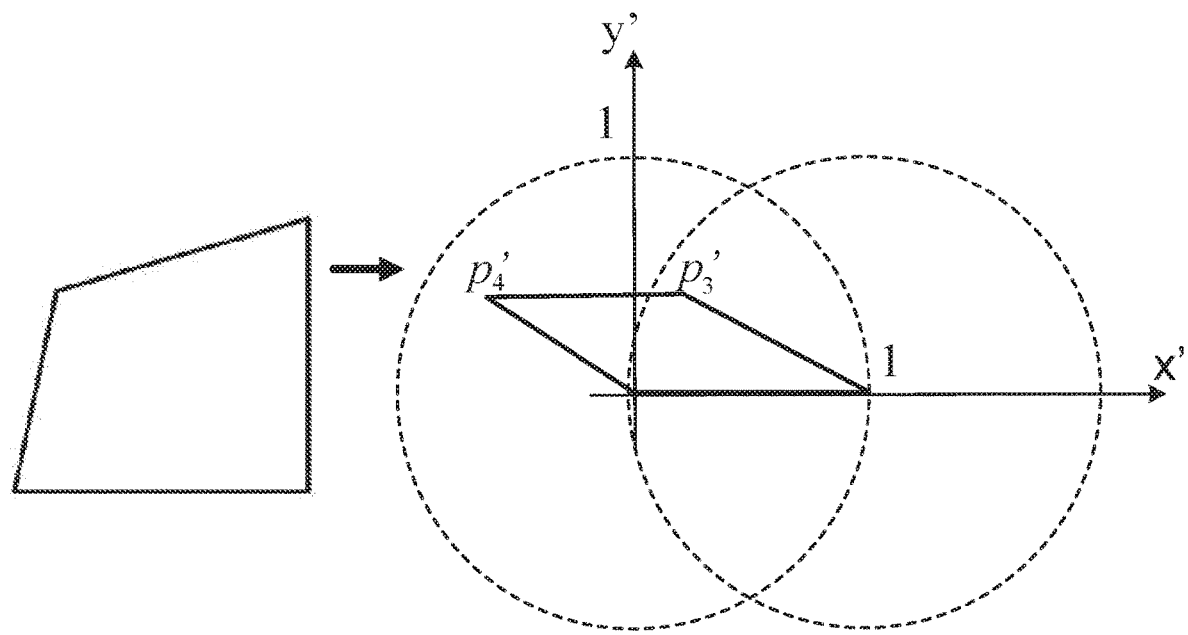
FIG. 3D is a schematic diagram showing the process to normalize the geometry information of a quadrilateral mesh cell.

FIG. 3D is a schematic diagram showing the process to normalize the geometry information of a quadrilateral mesh cell. Similar to the process described for a triangular mesh cell, the quadrilateral mesh cell is linearly mapped into a new coordinate system x'-y' such that the longest edge is on the x' axis from 0 to 1. Through this normalization process, the geometry information of the quadrilateral cell can be represented by coordinate information of the vertex $P_3'=(P_{3x}', P_{3y}')$ and the vertex $P_4'=(P_{4x}', P_{4y}')$. Therefore, the input layer to the neural network can be a vector $(P_{3x}', P_{3y}', P_{4x}', P_{4y}', a_0, n_x', n_y')$.

Figure 3E:
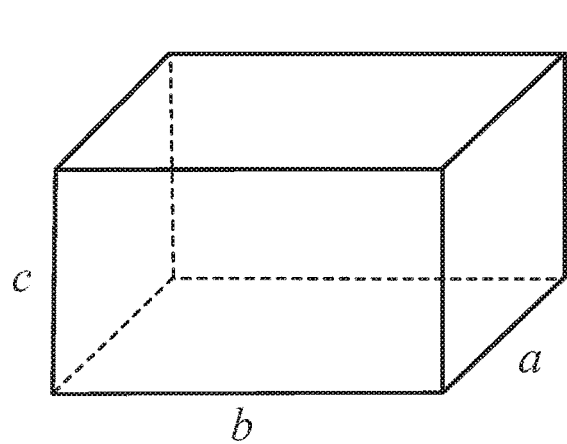
FIG. 3E is a schematic diagram showing the process to normalize the geometry information of a rectangular cuboid mesh cell.

FIG. 3E is a schematic diagram showing the process to normalize the geometry information of a rectangular cuboid mesh cell. In a rectangular cuboid mesh cell, all angles are right angles and opposite faces of the mesh cell are equal. The geometry information of the rectangular cuboid mesh cell can be represented by a height-to-length ratio $r_1=c/b$ and a width-to-length ratio $r_2=a/b$. Similar to the rectangular mesh cell, it is preferred that the height-to-length ratio $r_1=c/b$ is smaller than one and the width-to-length ratio $r_2=a/b$ is smaller than one. Therefore, the input layer to the neural network can be a vector $(r_1, r_2, a_0, n_x', n_y', n_z')$, where $n_x', n_y', n_z'$ are the normalized normal vector components in a new coordinate system whose axes are parallel to the cuboid sides.

Figure 3G:
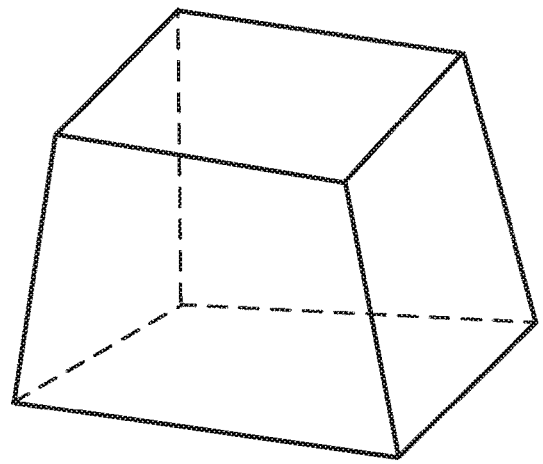
FIG. 3G is a schematic diagram showing the process to normalize the geometry information of a hexahedron mesh cell.
Figure 3F:
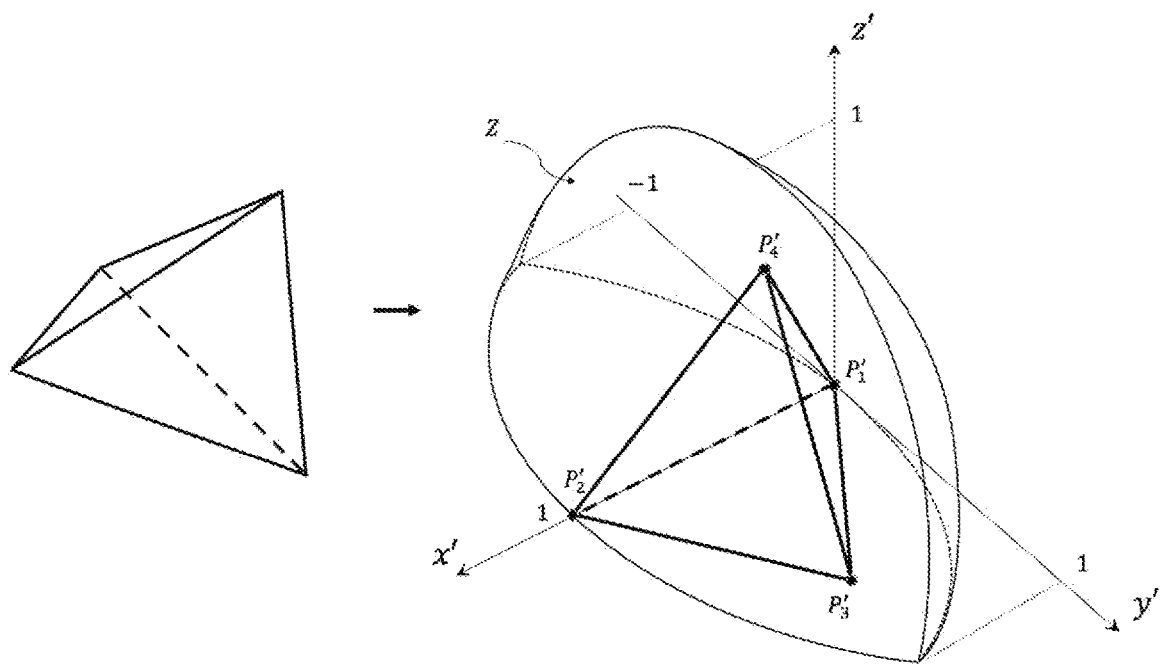
FIG. 3F is a schematic diagram showing the process to normalize the geometry information of a tetrahedron mesh cell.

FIG. 3F is a schematic diagram showing the process to normalize the geometry information of a tetrahedron mesh cell. A tetrahedron mesh cell is one of the most popular mesh cell types in CFD. As shown in FIG. 3F, after mapping the longest edge onto the x' axis from 0 to 1, the geometry information of the tetrahedron mesh cell can be represented by coordinate information of the vertex $P_3'=(P_{3x}', P_{3y}', 0)$ and the vertex $P_4'=(P_{4x}', P_{4y}', P_{4z}')$, which are both limited to volume Z shown in FIG. 3F. The normalized tetrahedron mesh cell can represent a triangular cell in the x'-y' plane by $P_3'$ and can use $P_4'$ to represent the heights of the tetrahedron mesh cell. The input layer to the neural network can be a vector $(P_{3x}', P_{3y}', P_{4x}'P_{4y}', P_{4z}', a_0, n_x', n_y', n_z')$.

FIG. 3G is a schematic diagram showing the process to normalize the geometry information of a hexahedron mesh cell. Following a similar normalization process, a hexahedron mesh call can be mapped into a new coordinate. The geometry information of the hexahedron mesh cell can be described with four coordinates each of which contains three values that defines each of the points on the top surface, and two coordinates in the x'-y' plane similar to the two coordinates of the quadrilateral mesh cell described in FIG. 3D. Therefore, the input layer to the neural network can be a vector having the form of $(P_{1x}', P_{1y}', P_{2x}', P_{2y}', P_{3x}', P_{3y}', P_{3z}', P_{4x}', P_{4y}', P_{4z}', P_{5x}', P_{5y}', P_{5z}', P_{6x}', P_{6y}', P_{6z}', a_0, n_x', n_y', n_z')$.

Figure 4A:
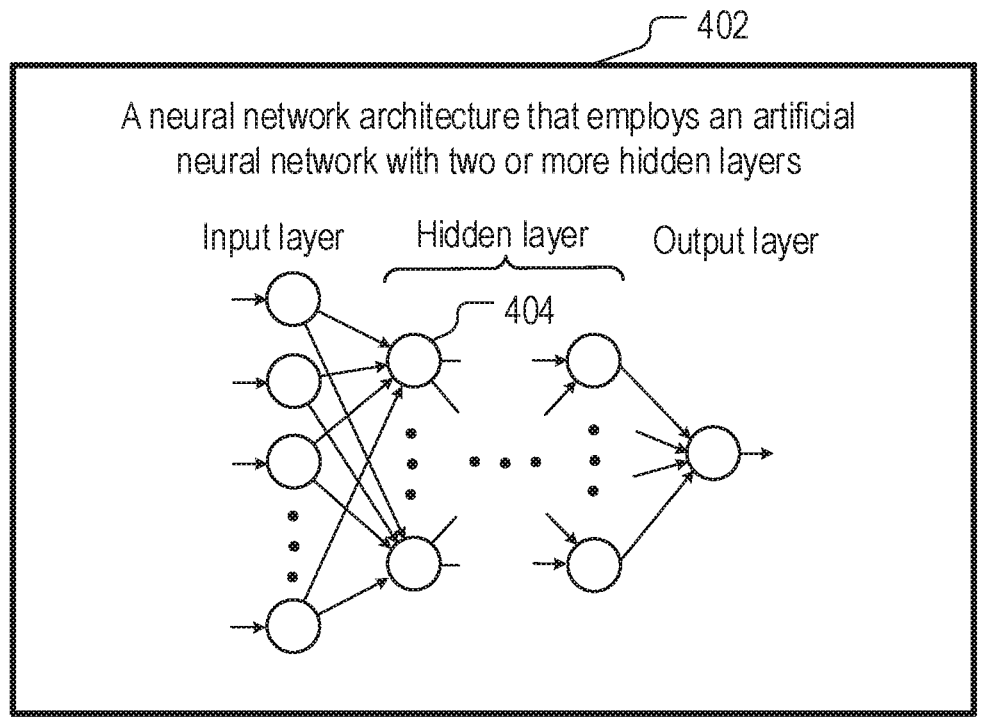
FIG. 4A is a schematic diagram showing an example of a neural network architecture for the machine learning algorithm that employs an artificial neural network.

FIG. 4A is a schematic diagram showing an example neural network architecture for the machine learning algorithm that employs an artificial neural network. The machine learning algorithm is trained to take the cell fraction $a_0$, the normal vector $\vec{n}$ and the geometry of the mesh cell as inputs and to output a calculated C value. As described previously, the output C defines a linear interface $\vec{n} \cdot \vec{x} + C = 0$ that splits the cell into two parts, with cell fraction $a_0$ and $1-a_0$.

Here, the machine learning algorithm is solving a regression problem which predicts a quantity of an output variable. The machine learning algorithm can employ various kinds of algorithm to solve regression problems. For example, the machine learning algorithm can employ neural networks, Regression Trees, Random Forests, or Deep Belief Networks, etc.

In FIG. 4A, the machine learning algorithm includes a neural network architecture that employs an artificial neural network 402. Artificial neural network can approximate and extract non-linear relationships between different parameters through a machine perception. The artificial neural network 402 is a fully-connected neural network that includes an interconnected network of artificial neurons 404. The artificial neural network 402 can be programmed, or can be implemented using a deep learning library such as "Tensorflow".

The artificial neural network 402 includes an input layer, a series of fully-connected hidden layers and an output layer. The input layer differs depending on the mesh structure. For example, for a cubic mesh cell, the input layer can be $(n_x, n_y, n_z, a_0)$ because a cubic mesh cell is regular and does not need additional geometric information. As another example, for a triangular mesh cell, the input layer can be $(P_{3x}', P_{3y}', n_x, n_y, a_0)$ because a triangular mesh cell is irregular and additional normalized geometric information $(P_{3x}'P_{3y}')$ is needed.

In the series of fully-connected hidden layers, each neuron is connected to every neuron in the previous layer. Increasing the number of hidden layers and number of neurons in each hidden layer can increase the feature extraction and representation capability of the neural network algorithm, at a cost of increased computation. The computation cost can be reduced by using other kinds of neural networks, such as convolutional neural networks. In convolutional neural networks, each neuron is connected to a few neurons in the previous layer, instead of every neuron in the previous layer.

Figure 4B:
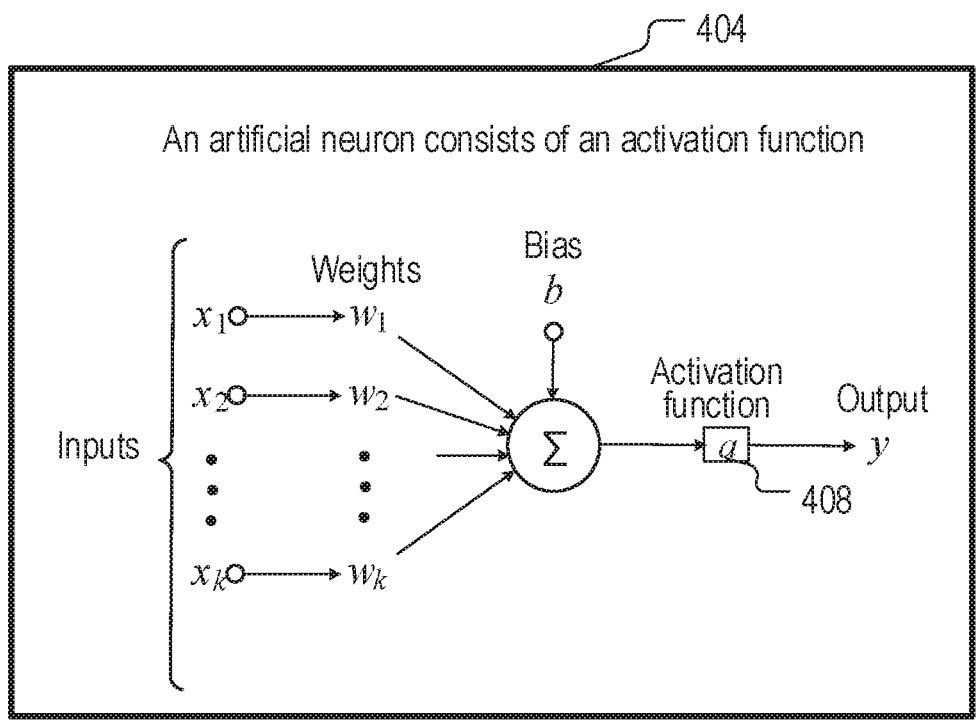
FIG. 4B is a schematic diagram showing an artificial neuron with an activation function.

FIG. 4B is a schematic diagram showing an artificial neuron 404 with an activation function 408. Each neuron includes a set of inputs x (e.g., $x_1, x_2, \ldots, x_k$), weights w (e.g., $w_1, w_2, \ldots, w_k$), a bias b and output y. The bias is added to a combined sum of input-weight products, and the result of the addition passes through an activation unit 408. The activation unit implements an activation function a, which can be a sigmoid or (Rectified Linear Unit) ReLU function. In the example artificial neuron 404 shown in FIG. 4B, the output y can be expressed as $y=a(x_1w_1+ \ldots +x_kw_k+b)$.

ReLU activation function can be a preferred choice for implementing the activation function in the neurons of the hidden layers. ReLU is a non-linear function and a combination of ReLU function allows non-linear approximations of the non-linear behavior of the PLIC dataset. ReLU function is less computationally expensive than sigmoid and tanh functions and is efficient to implement. When the input to the ReLU function is less than 0, a neuron with a ReLU activation function does not respond (output of the activation function equals to 0), which leads to sparsity of neuron activations.

One example implementation of the artificial neural network 402 can include two hidden layers each including N neurons, a ReLU function as the activation function within each neuron, and a linear activation function for an output layer of the artificial neural network. The output layer for the neural network that predicts a single value C can be a single neuron 404 as shown in FIG. 4B. The activation function in the output layer is not ReLU, but is a linear function to enable a continuous output from the output layer.

The implementation of the neural network algorithm is not limited to the techniques described in connection with FIG. 4A and FIG. 4B. Other neural network architectures, such as convolutional neural networks, recurrent neural networks, including a hybrid combination of one or more of them, can also be applied to the systems and techniques of the present disclosure.

Figure 5:
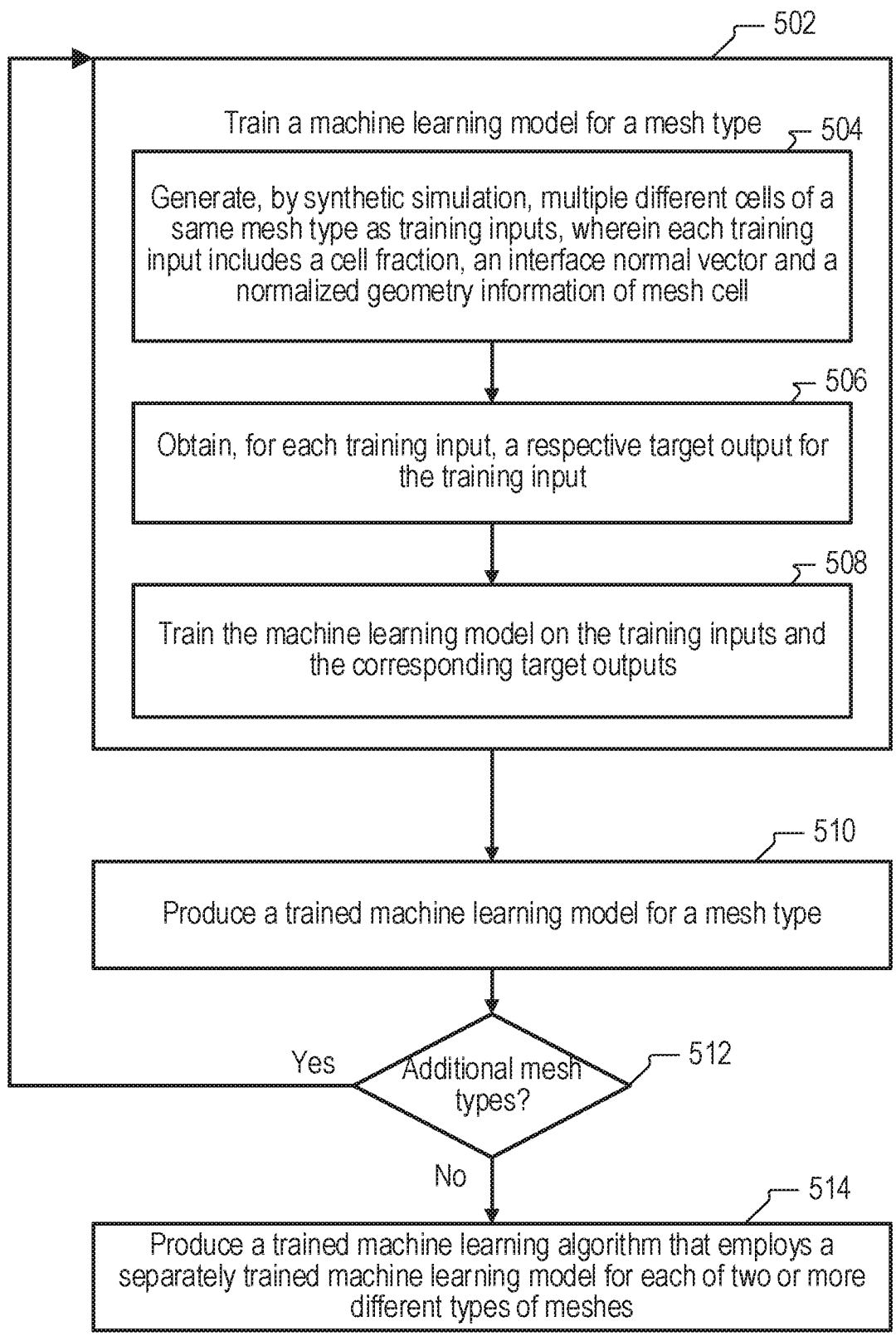
FIG. 5 is a flowchart showing an example of a process to train the machine learning algorithm.

FIG. 5 is a flowchart showing an example of a process to train the machine learning algorithm. In general, a machine learning algorithm builds a mathematical model based on training data. Training 502 and producing 510 a trained machine learning model (e.g., neural network) for a mesh type is shown in FIG. 5. In some implementations, a computer numerical simulation program uses linear interfaces for mesh cells in numerical simulation processing of two or more different types of meshes. For example, the two or more different types of meshes can include two or more of a square mesh type, a cubic mesh type, a rectangular mesh type, a rectangular cuboid mesh type, a triangular mesh type, a tetrahedron mesh type, a quadrilateral mesh type, and an irregular hexahedron mesh type.

After a trained machine learning model for a mesh type is produced, whether machine learning models for additional mesh types are needed is determined 512. If it is determined that machine learning models for additional mesh types are needed, a machine learning model for each of the additional mesh types can be separately trained and produced. This process is repeated executed until machine learning models for all the required mesh types have been produced. Finally, a trained machine learning algorithm that employs a separately trained machine learning algorithm model for each of the two or more different types of meshes is produced 514. The trained machine learning algorithm can process each of the two or more different types of meshes using the corresponding separately trained machine learning model.

When training 502 a machine learning model for a mesh type, multiple different mesh cells of a same mesh type are generated 504 by synthetic simulation in order to produce training inputs. Each training input includes a cell fraction, an interface normal vector and a normalized geometry information of the corresponding mesh cell.

For example, millions of different triangular mesh cells can be generated by synthetic simulation in order to produce enough training inputs to a machine learning model for processing triangular mesh cells. The synthetic simulation can generate 360 different vectors for $\vec{n}$, 50 different values for $a_0$, and 200 different coordinates for $P_3'$, each within their applicable range. These values can be generated randomly or following a certain pre-defined order. Then the synthetic simulation can combine different values for each $\vec{n}$, $a_0$ and $P_3'$ and generate a total of 3,600,000 training inputs. An alternative method to generate the geometric inputs is to sample different types of mesh cells from meshes generated by various meshing algorithms.

Each training input can include normalized geometry information for the corresponding mesh cell. As discussed previously, the normalization of the input data generally speeds up learning and leads to faster convergence during the training of the machine learning model. In terms of mesh geometries, normalization of the geometric information also significantly reduces the number of training inputs for a certain mesh type by eliminating geometrically similar shapes.

For each training input, a respective target output is obtained 506. For example, the target output can be computed by calculating an exact PLIC solution, i.e., the value C, through iterative or analytical approaches with first or higher order ($\geq 2$) accuracy. Millions of target outputs can be obtained for millions of corresponding training inputs. The accuracy of the machine learning PLIC depends on the level of accuracy of the generated target output e.g., the machine learning PLIC can reach second-order accuracy provided that the algorithm to generate the target outputs is second-order accurate.

The machine learning model is trained 508 on the training inputs and the corresponding target outputs. In some implementations, when the machine learning model includes a neural network model, the network weights w and biases b are randomly initialized at first. Training the machine learning model results in finding a combination of weights and biases that best map the appropriate training inputs to the target outputs, i.e., the correct PLIC solutions.

In some implementations, during training, the training inputs are randomly grouped into batches and then fed into the neural network model. This may result in a faster convergence and better prediction of the model compared with feeding the neural network model with a set of data that are organized in a certain order.

A batch size is a hyperparameter that defines the number of training inputs to work through before updating the neural network model parameters. While using a larger batch size to train a model is often preferred to reduce the training time, too large of a batch size may result in bad generalization of the neural network model, i.e., overfitting. In practice, the batch size can be determined experimentally. For example, in some implementations, a batch size of 128 may result in a good balance between the accuracy and convergence speed.

After the synthetic training inputs are fed to the neural network, the weights and biases in the neural network are updated iteratively by exploiting the gradient of a loss function. In some implementations, the loss function can be expressed as:

$$\text{Loss}(C, \overline{C}) = \Sigma_{batch}(C - \overline{C})^2.$$

This loss function is the squared sum of the difference between each predicted output value C from a neural network and the target output value $\overline{C}$, summed over the training batch. Various optimization algorithms can be employed in training, e.g., stochastic gradient descent, or Adam optimization, etc.

For example, the machine learning model discussed above can be developed and trained using "Tensorflow" deep learning library. Computations can be carried out on a NVIDIA 1080Ti GPU card with 11 GB GDDR5X frame buffer, using a PC running Linux Ubuntu 18.1 with Intel Core i7-8700K Processor (6 Cores, up to 4.7 GHz) and 32 GB of DDR4 RAM. The machine learning model can employ a neural network architecture with two hidden layers each including N=20 or N=100 neurons. The neural network can be trained for 500 epochs with a batch size of 128. During training, Adam optimization algorithm can be used with a learning rate of $10^{-3}$, and with update parameters $\beta_1 = 0.9$ and $\beta_2 = 0.999$. The training of the neural network can take 3 to 4 hours. The training time can be reduced significantly, to just a few minutes, if a much larger batch size is used. However, better accuracy can be achieved when using a batch size of 128.

Training the machine learning algorithm can be done at various places. In some implementations, remote computer systems 150 perform the training with the advantage of having larger memory storage and better computation resources. In some implementations, the CNS program(s) 116 perform the training. In some implementations, data from multiple numerical simulation applications can be used to continually train a shared machine learning algorithm that is used by those separate numerical simulation applications in their respective simulation environments.

Training a machine learning algorithm may require large memory and specialized high performance processors, including processors with graphical processing units (GPUs). The training 502 can run locally on computer 110, remotely on a computer of one or more remote computer systems 150 (e.g., one or more computer systems with large memory and one or more GPUs accessible by the computer 110 via the network 140) or both locally and remotely. Thus, the training 502 can offload processing operations (e.g., forward and backward propagation calculations, gradient descent calculations, etc.) "to the cloud" by having one or more operations run on one or more computers 150.

Figure 6:
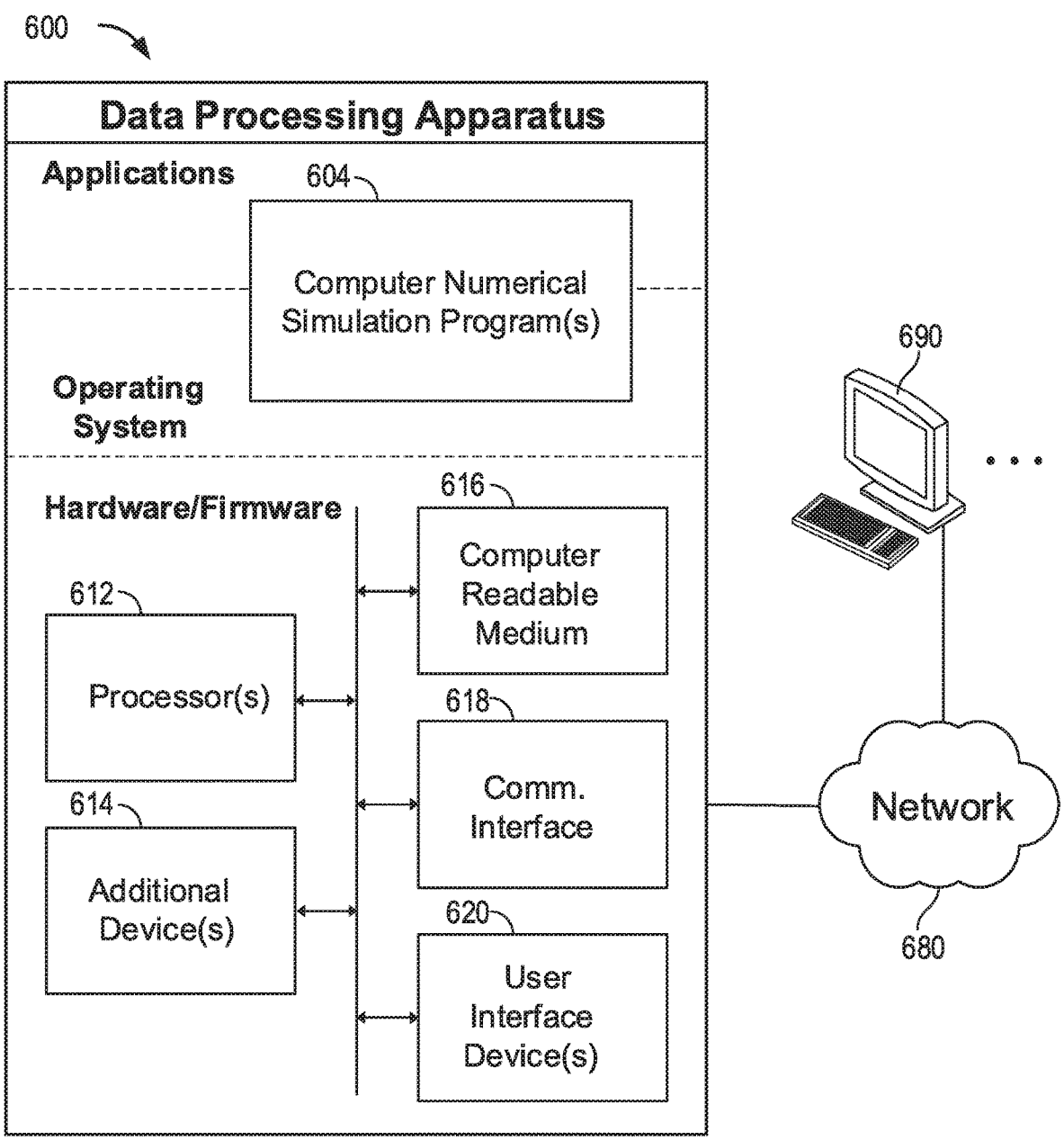
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of one or more computer numerical simulation program(s) 604 that implement the systems and techniques described herein. Thus, the computer numerical simulation program(s) 604 can construct piecewise linear interfaces for meshes in various numerical simulation applications.

The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor, with or without GPUs. Each processor 612 is capable of processing instructions stored on the computer readable medium 616 or on a storage device, such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

The systems and techniques described in this disclosure can provide a machine learned based data-driven solution for piecewise linear interface construction in VOF algorithms. This machine learning based solution can result in accurate calculations at a fraction of the usual computation cost, compared with analytical or iterative approaches which involve complex geometrical operations. Therefore, the systems and techniques described in this disclosure may be a more efficient solution to PLIC problems in computer numerical simulation applications.

The systems and techniques described in this disclosure can be applied to numerical simulation processing of two or more different types of meshes. The computer numerical simulation program(s) can use a machine learning algorithm that employs a separately trained artificial neural network for each of the two or more different types of meshes. In some implementations, the two or more different types of meshes include two or more of a square mesh type, a cubic mesh type, a rectangular mesh type, a rectangular cuboid mesh type, a triangular mesh type, a tetrahedron mesh type, a quadrilateral mesh type, and an irregular hexahedron mesh type, etc.

For example, a CFD solver may need to solve the advection equation for the volume fraction field by constructing interfaces using PLIC for both square meshes and triangular meshes. The CFD solver can use the computer numerical simulation program(s) that employs a trained artificial neural network for square meshes and a trained artificial neural network for triangular meshes. The trained artificial neural network for square meshes can compute PLIC for square mesh cells. The trained artificial neural network for triangular meshes can compute PLIC for triangular mesh cells.

The systems and techniques described in this disclosure can be readily integrated into an existing workflow of a numerical simulation application. The machine learning algorithm can be implemented as subroutines and can be called from other programs.

The systems and techniques described in this disclosure can be used in various kinds of numerical simulation applications. CFD simulation tools can predict how fluids perform given specified constrains of a design. CFD simulation tools can design optimal fluid flow and can model free surface movement. In CFD simulation, the constructed piecewise linear interface of interface cells can be used to calculate volume fluxes geometrically during a simulation of fluid dynamics. A CFD solver can use the machine learning based PLIC to solve the advection equation for the volume fraction field. A CFD solver can utilize the machine learning based PLIC to improve estimation of interface normal and curvature by correcting a level-set field. In multiphase simulations, the machine learning PLIC can be used to resolve contact line dynamics and interaction between the interface of two different phases.

In plastic injection and compression molding design, numerical simulation tools can simulate the behavior of the plastic materials in injection molding processes and can identify potential challenges in manufacturing plastic injection molded parts before beginning production. For example, the numerical simulation tools for plastic injection molding design can find areas that are difficult to fill. Through numerical simulation, users can see how changes of material, geometry, wall thickness and gate location can affect the manufacturing capability of plastic material. As another example, in gas-assisted injection molding, the shape and penetration of gas channel can be optimized. Numerical simulation tools can track the gas and liquid interface using machine learning based PLIC and therefore improve the location of injection position and delay time. For example, the numerical simulation application in FIG. 1, i.e., Computational Fluid Dynamics Solver 170, can be replaced by a plastic injection molding simulation. The behavior of the plastic material in injection molding process can be simulated using linear interface for the mesh cell in a mesh.

In computer graphics, the method and techniques discussed herein can be used to extract a polyhedral mesh surface from a 3D iso-surface for further mesh-based calculation or for efficient visualization. A computer numerical simulation program can first translate the iso-surface into a VOF scalar over a cubic mesh grid, and then the computer numerical simulation program can construct the surface mesh representing the interface in each individual cube. In geometry optimization and automatic design applications, the machine learning based PLIC can be used to construct a product or component design surface from a solution field variable. Such a design surface can then be realized in a Computer Aided Design (CAD) model for further application and production evaluation and planning. The machine learning based PLIC surface construction would be based on a threshold or target value of the solution field variable. The solution field variable being the outcome of an optimization function which aims to quantify the preferred location and shape of the product geometry in order to efficiently achieve load or performance functions, whether structural, thermal or other performance function. For example, the numerical simulation application in FIG. 1, i.e., Computational Fluid Dynamics Solver 170, can be replaced by a topology or geometry optimization application that is based on a solution field variable and a threshold value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, in a computer numerical simulation program, a cell fraction for a mesh cell in a mesh, a normal vector perpendicular to a linear interface for the mesh cell, and geometry information of the mesh cell, wherein the geometry information comprises at least two data values;

normalizing, by the computer numerical simulation program, the geometry information of the mesh cell to reduce the at least two data values to at least one data value, wherein a number of the at least one data value is less than a number of the at least two data values;

providing, by the computer numerical simulation program, the cell fraction for the mesh cell, vector components corresponding to the normal vector perpendicular to the linear interface for the mesh cell, and the at least one data value to a machine learning algorithm, wherein the machine learning algorithm was previously trained using normalized geometry information of multiple different cells of a same mesh type as the mesh cell;

receiving, by the computer numerical simulation program, an output value from the machine learning algorithm;

determining the linear interface for the mesh cell based on the output value, the normal vector and the geometry information; and using, by the computer numerical simulation program, the linear interface for the mesh cell in numerical simulation processing of the mesh.

2. The method of claim 1, wherein the machine learning algorithm is a neural network algorithm that employs an artificial neural network, a rectified linear unit activation function for one or more hidden layers within the artificial neural network, and a linear activation function for an output layer of the artificial neural network.

3. The method of claim 2, wherein the mesh type is triangular, the mesh is a triangular mesh, the mesh cell is a triangle having three vertices, the geometry information comprises coordinates of the three vertices in a coordinate system; and wherein the normalizing comprises: identifying a longest edge of the triangle, wherein a first vertex and a second vertex are on the longest edge, and wherein a third vertex is not on the longest edge; mapping the triangle to a new coordinate system having an origin, comprising mapping the longest edge along one axis of the new coordinate system, wherein the first vertex is at the origin and a length of the longest edge equals to 1 after mapping; obtaining a normalized geometry information for the triangle that only has a coordinate of the third vertex in the new coordinate system, and a normalized normal vector in the new coordinate system; and wherein the providing comprises: providing the cell fraction for the triangular mesh cell, the vector components corresponding to the normalized normal vector, and the normalized geometry information for the triangle to the neural network algorithm, wherein the neural network algorithm was previously trained using normalized geometry information of multiple different triangles of multiple triangular mesh cells; and wherein the determining comprises: obtaining a final output value by remapping the output value back to the coordinate system of the triangular mesh cell; determining a reconstructed line by the normal vector and the final output value; and determining the linear interface for the triangular mesh cell by intersecting the reconstructed line with the triangle.

4. The method of claim 2, further comprising training the neural network algorithm.

5. The method of claim 4, wherein training the neural network algorithm comprises:
   generating, by synthetic simulation, multiple different cells of a same mesh type as training inputs, wherein each of the training inputs comprises a cell fraction, an interface normal vector and a normalized geometry information of a mesh cell;
   obtaining, for each of the training inputs, a respective target output for the training input; and
   training the neural network algorithm on the training inputs and the corresponding target outputs.

6. The method of claim 2, wherein the mesh is a first mesh type, the computer numerical simulation program uses linear interfaces for mesh cells in numerical simulation processing of two or more different types of meshes, including the first mesh type, and the neural network algorithm employs a separately trained artificial neural network for each of the two or more different types of meshes.

7. The method of claim 6, wherein the two or more different types of meshes comprise two or more of a square mesh type, a cubic mesh type, a rectangular mesh type, a rectangular cuboid mesh type, a triangular mesh type, a tetrahedron mesh type, a quadrilateral mesh type, and an irregular hexahedron mesh type.

8. The method of claim 1, wherein the numerical simulation processing comprises Computational Fluid Dynamics simulation, and the method further comprises tracking fluid interfaces using the linear interface for the mesh cell in a mesh.

9. The method of claim 1, wherein the numerical simulation processing comprises plastic injection molding simulation, and the method further comprises simulating behavior of plastic material in an injection molding process using the linear interface for the mesh cell in a mesh.

10. The method of claim 1, wherein the numerical simulation processing comprises a topology or geometry optimization based on a solution field variable and a threshold value.

11. A system comprising:
   a non-transitory storage medium having instructions of a computer numerical simulation program stored thereon; and
   one or more data processing apparatus configured to run the instructions of computer numerical simulation program to perform operations specified by the instructions of the computer numerical simulation program;
   wherein the operations comprise
      obtaining a cell fraction for a mesh cell in a mesh, a normal vector perpendicular to a linear interface for the mesh cell, and geometry information of the mesh cell, wherein the geometry information comprises at least two data values;
      normalizing the geometry information of the mesh cell to reduce the at least two data values to at least one data value, wherein a number of the at least one data value is less than a number of the at least two data values;
      providing the cell fraction for the mesh cell, vector components corresponding to the normal vector perpendicular to the linear interface for the mesh cell, and the at least one data value to a machine learning algorithm, wherein the machine learning algorithm was previously trained using normalized geometry information of multiple different cells of a same mesh type as the mesh cell;
      receiving an output value from the machine learning algorithm;
      determining the linear interface for the mesh cell based on the output value, the normal vector and the geometry information; and
      using the linear interface for the mesh cell in numerical simulation processing of the mesh.

12. The system of claim 11, wherein the machine learning algorithm is a neural network algorithm that employs an artificial neural network, a rectified linear unit activation function for one or more hidden layers within the artificial neural network, and a linear activation function for an output layer of the artificial neural network.

13. The system of claim 12, wherein the mesh type is triangular, the mesh is a triangular mesh, the mesh cell is a triangle having three vertices, the geometry information comprises coordinates of the three vertices in a coordinate system; and
   wherein the normalizing comprises: identifying a longest edge of the triangle, wherein a first vertex and a second vertex are on the longest edge, and wherein a third vertex is not on the longest edge; mapping the triangle to a new coordinate system having an origin, comprising mapping the longest edge along one axis of the new coordinate system, wherein the first vertex is at the origin and a length of the longest edge equals to 1 after mapping; obtaining a normalized geometry information for the triangle that only has a coordinate of the third vertex in the new coordinate system, and a normalized normal vector in the new coordinate system; and
   wherein the providing comprises: providing the cell fraction for the triangular mesh cell, the vector components corresponding to the normalized normal vector, and the normalized geometry information for the triangle to the neural network algorithm, wherein the neural network algorithm was previously trained using normalized geometry information of multiple different triangles of multiple triangular mesh cells; and
   wherein the determining comprises: obtaining a final output value by remapping the output value back to the coordinate system of the triangular mesh cell; determining a reconstructed line by the normal vector and the final output value; and determining the linear interface for the triangular mesh cell by intersecting the reconstructed line with the triangle.

14. The system of claim 12, wherein the operations further comprise training the neural network algorithm, comprising:
   generating, by synthetic simulation, multiple different cells of a same mesh type as training inputs, wherein each of the training inputs comprises a cell fraction, an interface normal vector and a normalized geometry information of a mesh cell;
   obtaining, for each of the training inputs, a respective target output for the training input; and
   training the neural network algorithm on the training inputs and the corresponding target outputs.

15. The system of claim 12, wherein the mesh is a first mesh type, the computer numerical simulation program uses linear interfaces for mesh cells in numerical simulation processing of two or more different types of meshes, including the first mesh type, and the neural network algorithm employs a separately trained artificial neural network for each of the two or more different types of meshes.

16. The system of claim 15, wherein the two or more different types of meshes comprise two or more of a square mesh type, a cubic mesh type, a rectangular mesh type, a rectangular cuboid mesh type, a triangular mesh type, a tetrahedron mesh type, a quadrilateral mesh type, and an irregular hexahedron mesh type.

17. The system of claim 11, wherein the numerical simulation processing comprises Computational Fluid Dynamics simulation, and wherein the operations further comprise tracking fluid interfaces using the linear interface for the mesh cell in a mesh.

18. The system of claim 11, wherein the numerical simulation processing comprises plastic injection molding simulation, and wherein the operations further comprise simulating behavior of plastic material in an injection molding process using the linear interface for the mesh cell in a mesh.

19. The system of claim 11, wherein the numerical simulation processing comprises a topology or geometry optimization based on a solution field variable and a threshold value.

20. A non-transitory computer-readable medium encoding instructions operable to cause data processing apparatus to perform operations comprising:

obtaining, in a computer numerical simulation program, a cell fraction for a mesh cell in a mesh, a normal vector perpendicular to a linear interface for the mesh cell, and geometry information of the mesh cell, wherein the geometry information comprises at least two data values;

normalizing, by the computer numerical simulation program, the geometry information of the mesh cell to reduce the at least two data values to at least one data value, wherein a number of the at least one data value is less than a number of the at least two data values;

providing, by the computer numerical simulation program, the cell fraction for the mesh cell, vector components corresponding to the normal vector perpendicular to the linear interface for the mesh cell, and the at least one data value to a machine learning algorithm, wherein the machine learning algorithm was previously trained using normalized geometry information of multiple different cells of a same mesh type as the mesh cell;

receiving, by the computer numerical simulation program, an output value from the machine learning algorithm;

determining the linear interface for the mesh cell based on the output value, the normal vector and the geometry information; and using, by the computer numerical simulation program, the linear interface for the mesh cell in numerical simulation processing of the mesh.

* * * * *